2,924,508

METHOD OF PRODUCTION OF STANNOUS FLUORIDE

Joe E. Gilliland, Raymond Ray, and Wayne E. White, Tulsa, Okla., assignors to Ozark-Mahoning Company, Tulsa, Okla., a corporation of Delaware No Drawing. Application September 20, 1956
Serial No. 610,890

2 Claims. (Cl. 23—88)

The present invention is directed to production of stannous fluoride ($SnF_2$) which is at the present time of commercial importance primarily as an additive for dentifrices to supply fluorine values to human teeth for reducing incidence of dental caries.

It has been considered impractical to produce $SnF_2$ by bringing together in a reacting mass metallic tin and hydrogen fluoride (HF) or hydrofluoric acid, the reason commonly ascribed for this being that the acid tends to form a film of HF-insoluble $SnF_2$ on exposed surfaces of the metal particles which inhibits reaction with the subsurface metal by the surrounding acid and efforts to overcome this by use of finely divided particles of tin result in the latter reacting with the acid with evolution of considerable heat which fuses the tin particles into a relatively impenetrable mass substantially incapable of separation into $SnF_2$ and metallic tin. We have found, however, that under proper conditions and with suitable controls it is possible to produce relatively pure $SnF_2$ through interaction of metallic tin and hydrogen fluoride.

It is therefore a principal object of the invention to provide a method of production and recovery of $SnF_2$ by chemical reaction between metallic tin and hydrogen fluoride.

For the production of dentifrice quality $SnF_2$ in accordance with the invention the tin to be used in the reaction should be in finely divided state and virtually pure, and we have found that a commercially available substantially chemically pure tin powder of particle size such that 98% or more by weight will pass a 325-mesh screen is satisfactory. For reacting with this powder we preferably employ anhydrous or substantially anhydrous hydrogen fluoride which should likewise be substantially chemically pure.

These starting materials are readily available in quantity and manufacture of $SnF_2$ therefrom on a laboratory scale can be accomplished by placing a small quantity of the tin, say about 0.1 mole (11.87 g.) in a cold bottle to which is attached a tube arranged as a reflux condenser; approximately twice as much cold hydrogen fluoride by weight is then carefully introduced into the bottle a little at a time while maintaining a flow of coolant through the condenser jack at a temperature such as to cause condensation and return to the bottle of hydrogen fluoride vapors evolved from the reaction mass. After several hours without further manipulation reaction in the mass is complete in respect to the tin contained therein after which by ordinary laboratory procedures residual or excess hydrogen fluoride uncombined with tin is removed by evaporation; the white crystalline solid remaining in the bottle consists of substantially pure $SnF_2$ devoid of metallic tin or other contaminants. In one instance in which this procedure was followed the $SnF_2$ recovered from reaction of hydrogen fluoride with 0.1 mole of powdered tin was found to have a mass of 15.60 g. whereas the theoretical yield from reaction of hydrogen fluoride with 0.1 mole of metallic tin is 15.67 g., a recovery of more than 99.5% of the amount of $SnF_2$ theoretically produced.

On a larger scale a substantially like reaction between finely divided metallic tin and HF may be effected by introducing a quantity of anhydrous HF into a suitable reactor having a reflux condenser connected with it and operative to cool evolved gases to a temperature of −30° C. or below so as to inhibit untimely escape of HF from the reaction chamber although affording to evolved hydrogen a relatively free exit therefrom, and while any suitable means for introducing the tin to the reactor may be employed, we prefer to utilize therefor an elongated closeable container positioned above the reactor and connected with its top by a pipe having a pair of vertically spaced gate valves with a valve-controlled connection between them for admitting a gaseous fluid and a similar connection adjacent the top of the container. At the commencement of operations with such apparatus all valves are first closed, the container is charged with an appropriate amount of finely divided tin of the character mentioned and then closed, and the appropriate quantity of anhydrous HF likewise charged into the reactor. Both valves controlling the flow of the gaseous fluid, which may be air or any suitable gas such as helium, at a pressure sufficient to force the tin into the reactor are then turned on and adjusted to maintain a slight differential in favor of the fluid entering the container; the lower gate valve in the feed pipe is next opened to purge the lower part of the pipe from any HF which may have collected between the valves. Finally, the upper feed valve is opened either fully or only for a small amount depending on whether it be desired to discharge the contents of the container at once or more gradually in a continuous slow feed.

Means are also provided for constantly agitating, as by stirring, the liquid HF in the reactor to maintain an even temperature throughout its mass whereby as the particles of tin enter it they encounter no "hot spots" which would tend to fuse them together, and as the heat incident to the reaction is rapidly carried off through evaporation of the low boiling point HF excessive heating and consequent fusion of the particles from that source cannot occur. Thus after entering the liquid the identity of the particles is preserved and their reaction individually with the HF can take place.

The design of any apparatus for introducing the powdered tin to the reactor should be such as to prevent agglomeration of the tin by the HF fumes adjacent the opening through which the tin passes to the reactor and apparatus of the character just described is effective for that purpose since it may be operated to clear the feed pipe of such fumes before the tin feed is commenced and to thereafter keep it free thereof while the feed is in progress. But, as heretofore mentioned, apparatus of other design and construction may be employed if preferred as long as it is effective to feed the powdered tin into the liquid HF without substantial agglomeration or fusion occurring before it reaches the liquid.

It should further be borne in mind in determining the design of the reactor that the condenser discharge passage be of sufficient capacity to allow for escape of the gaseous fluid introduced as well as of the hydrogen evolved from the reaction, without impairment, however, of its capacity for condensing and returning as a liquid to the reaction chamber any HF received into it in the vapor phase.

As it is advisable not to continue the reaction beyond the point at which about one-third the HF originally introduced has been satisfied in accordance with the equation:

$$Sn + 2HF \rightarrow SnF_2 + H_2$$

the introduction of tin is discontinued after about one-third the amount theoretically required for complete reaction with the amount of the HF present has been supplied; this should leave in the reactor an amount of unreacted HF equal to about twice the amount reacted with the tin introduced, disregarding possible minor losses by evaporation from the reflux condenser or entrainment with the hydrogen discharged from the latter.

Since the reaction is exothermic it is unnecessary to supply heat to the reactor and, in fact, the return by gravity of relatively cold liquid HF from the reflux condenser when the latter is kept at −30° C. or below tends to counteract the heat generated in the reaction which otherwise might proceed with considerable violence if this or some other expedient were not employed for preventing overheating in the reaction vessel. HF boils at about room temperature (19.4° C.) and the reaction readily proceeds at approximately the slightly higher boiling point of the reacting mass when the conditions described are maintained; condensation of vaporized HF, together with cooling of escaping hydrogen, extracts from the system primarily only heat generated by the exothermic reaction.

Following discontinuance of the addition of metallic tin the excess HF in the mass is separated therefrom by usual procedures as, for example, through diversion to another vessel of the liquid HF condensed in the condenser with application of mild heat to the reaction vessel if desired as the end point in the evaporation process is approached or, if preferred, the contents of the reactor may be cooled sufficiently to crystallize out the $SnF_2$; the residual solution may then be returned to the system and readied for further use therein by addition of an appropriate quantity of fresh anhydrous HF.

The residual white crystalline material remaining in the reaction vessel after the evaporation of HF has been completed or that recovered by crystallization consists of $SnF_2$ and may be recrystallized from water if desired, although when pure starting materials are used this is normally not necessary as the procedures we have described yield $SnF_2$ in finely divided crystals which may be utilized as an additive to dentifrices without further treatment.

It will of course be evident to those skilled in the art that the highly corrosive nature of HF either in liquid or vapor phase makes it necessary to use materials for the reaction vessel and accessories not subject to attack thereby, and we have found platinum, silver, aluminum, steel and polyethylene suitable for this purpose, a fact which tends to negative the possibility that the reacting vessel has any catalytic effect in the reaction between the tin and HF, which reaction it has heretofore been thought could not be carried to completion in respect to either the tin or the HF component of the reacting mass.

It is believed our discovery that $SnF_2$ is soluble in an excess of anhydrous or substantially anhydrous HF at about its boiling point has contributed materially to the success of our method in that it demonstrates the advisability of allowing some HF vapor to be formed by the heat of the reaction and allowing the latter to proceed at about room temperature by extracting some heat from the system during injection of the powdered tin into the HF-containing reaction vessel or by whatever other specific operation be performed in bringing the reactants together.

As exemplifying production of $SnF_2$ on said larger scale in accordance with the procedure we have described, a 65-gallon aluminum reactor equipped with agitator, reflux condenser and tin feeding device may first be charged with 288 lbs. of anhydrous HF. With the mixer in constant operation finely divided tin may next be introduced through the feeding device at the rate of about 30 lbs. per hour for some nine and one-half hours until 284 lbs. thereof has entered the reactor, this being approximately the quantity theoretically required to satisfy about one-third of the amount of HF originally charged. Thereafter when a test of the liquid in the reactor shows it to contain substantially 65.6% $SnF_2$ the excess HF may be evaporated to leave about 375 lbs. of crystalline $SnF_2$, being approximately the amount theoretically obtainable from the 284 lbs. of tin.

Any suitable means for cooling the reflux condenser may be employed, a bath containing a mixture of solidified $CO_2$, "Dry Ice" and industrial alcohol being capable of providing a temperature as low as −70° C. on a laboratory scale, or appropriate mechanical refrigeration equipment may be utilized if preferred. It is desirable however that all parts of any equipment which may come in contact with HF in either liquid or vapor phase be made of or coated with a material resistant to attack by it, its capacity for fairly violent reaction with many materials resistant to ordinary corrosion being well known among those familiar with its properties and characteristics.

As the crystalline product obtained by the practice of our method is soluble in cold water it is apparent it may be added to dentrifrices in the manufacture thereof by any suitable or desired procedure in the proportions deemed appropriate for presenting on contact with the teeth of the consumer a proper concentration of a fluorine bearing compound, non-toxic at the concentration employed but adequate to reduce the incidence of dental caries, about 0.4% $SnF_2$ in tooth paste and comparable concentrations in other forms of dentrifrices being usually considered adequate and not injurious to the health of the user.

While we have herein described with considerable particularity certain procedures found suitable in the practice of our method, it will be understood we do not desire or intend to be limited or confined thereto or thereby as modifications and changes in the detailed character of the steps and apparatus employed will readily occur to those skilled in the art and may be utilized if desired without departing from the spirit and scope of the invention as defined in the appended claims.

Having thus described our invention, we claim and desire to protect by Letters Patent of the United States:

1. In a method of producing stannous fluoride, the steps of mixing relatively finely divided metallic tin and liquid, at least substantially anhydrous hydrofluoric acid in a reaction step, maintaining the reaction mixture at a substantially uniform temperature not greater than the boiling point of the liquid present in the reaction step by maintaining a sufficient quantity of liquid hydrofluoric acid continuously present in the reaction step and in contact with the tin reacting in the reaction step whereby to substantially prevent any agglomeration of tin into unreactive metallic bodies in said reaction step due to fusion together thereof in the presence of excess heat, and recovering stannous fluoride from the resultant solution.

2. A method of producing stannous fluoride by bringing together relatively finely divided metallic tin particles and liquid, at least substantially anhydrous of hydrofluoric acid in a reaction vessel wherein a body of said liquid hydrofluoric acid is continuously maintained in said vessel and only a limited quantity of said tin particles is added to and thoroughly dispersed in said hydrofluoric acid body at a given time, maintaining the reaction mixture at a substantially uniform temperature not greater than the boiling point of the liquid present in the reaction step by maintaining the quantity of liquid hydrofluoric acid present in said body during the addition to and dispersion of any quantity of tin therein always sufficient to continuously contact the dispersed reacting particles of tin with liquid hydrofluoric acid until said particles dissolve therein despite any evolution of hydrofluoric acid vapors from said body due to the exothermic character of the reaction, and recovering stannous fluoride from the resultant solution.

(References on following page)

References Cited in the file of this patent

UNITED STATES PATENTS

| | | |
|---|---|---|
| 1,148,194 | Siefert et al. | July 27, 1915 |
| 1,402,318 | Rodebush | Jan. 3, 1922 |
| 2,425,711 | Alexander | Aug. 19, 1947 |

OTHER REFERENCES

Friend: "A Text-Book of Inorganic Chemistry," vol. 5, page 343 (1917), published by Charles Griffin and Co., Ltd., London, England.

Thorpe's Dictionary of Applied Chem., vol. 5, 1916, pages 496, 498, Longmans, Green and Co., New York.

UNITED STATES PATENT OFFICE
CERTIFICATE OF CORRECTION

Patent No. 2,924,508                      February 9, 1960

Joe E. Gilliland et al.

It is hereby certified that error appears in the printed specification of the above numbered patent requiring correction and that the said Letters Patent should read as corrected below.

Column 4, line 56, after "anhydrous" strike out "of".

Signed and sealed this 9th day of August 1960.

(SEAL)
Attest:

KARL H. AXLINE                          ROBERT C. WATSON
Attesting Officer                      Commissioner of Patents